(12) United States Patent  
Janakiraman (10) Patent No.: US 9,967,164 B2  
(45) Date of Patent: May 8, 2018

(54) METHODS AND DEVICES TO EFFICIENTLY DETERMINE NODE DELAY IN A COMMUNICATION NETWORK

(71) Applicant: Tektronix, Inc., Beaverton, OR (US)

(72) Inventor: Vignesh Janakiraman, Plano, TX (US)

(73) Assignee: NetScout Systems Texas, LLC, Plano, TX (US)

( * ) Notice: Subject to any disclaimer, the term of this patent is extended or adjusted under 35 U.S.C. 154(b) by 154 days.

(21) Appl. No.: 14/474,785

(22) Filed: Sep. 2, 2014

(65) Prior Publication Data

US 2016/0065434 A1    Mar. 3, 2016

(51) Int. Cl.
*H04L 12/26* (2006.01)
*H04L 12/24* (2006.01)

(52) U.S. Cl.
CPC ........ *H04L 43/0852* (2013.01); *H04L 43/067* (2013.01); *H04L 43/12* (2013.01); *H04L 43/16* (2013.01); *H04L 41/0677* (2013.01); *H04L 43/045* (2013.01)

(58) Field of Classification Search
CPC ............................... H04L 43/16; H04L 43/12
See application file for complete search history.

(56) References Cited

U.S. PATENT DOCUMENTS 5,838,920 A * 11/1998 Rosborough ....... G06F 11/3419  
709/224  
6,041,352 A * 3/2000 Burdick .............. H04L 41/0659  
370/253  
2005/0025062 A1 * 2/2005 Costanza ............ H04L 12/5601  
370/250

(Continued)

FOREIGN PATENT DOCUMENTS

EP    1681799 A1    7/2006  
EP    2680637 A1    1/2014

(Continued)

OTHER PUBLICATIONS

Extended European Search Report for European Patent Application No. 15182222.8, dated Jan. 29, 2016.

(Continued)

*Primary Examiner* — Sulaiman Nooristany  
(74) *Attorney, Agent, or Firm* — Locke Lord LLP; Scott D. Wofsy; Christopher J. Capelli (57) ABSTRACT

A network monitoring device monitors at least one tap point corresponding to a network interface between User Equipment (UE) and one or more additional nodes in the communication network, detects one or more transactions at the at least one tap point corresponding to the network interface with each transaction including request data and response data. The network monitoring device further determines a time associated with the request data and a time associated with the response data for each transaction, determines a delay time for each transaction for the at least one tap point by a difference between the time associated with the request data and the time associated with the response data, assigns the delay time for each transaction to one or more a predefined time ranges, and increments a count corresponding to the one or more predefined time ranges when the delay time is assigned.

19 Claims, 6 Drawing Sheets

(56) References Cited

U.S. PATENT DOCUMENTS

| | | | | |
|---|---|---|---|---|
| 2012/0159151 A1* | 6/2012 | Janakiraman | ......... | H04L 43/028 713/153 |
| 2012/0278477 A1* | 11/2012 | Terrell | ................ | H04L 41/5009 709/224 |
| 2015/0023168 A1* | 1/2015 | Kotecha | ............ | H04W 28/0289 370/232 |
| 2015/0341237 A1* | 11/2015 | Cuni | .................... | H04L 43/067 709/224 |

FOREIGN PATENT DOCUMENTS

| WO | WO-03096729 A1 | 11/2003 |
|---|---|---|
| WO | WO-2006128137 A2 | 11/2006 |

OTHER PUBLICATIONS

Examination Report for European Patent Application No. 15182222.8, dated Oct. 20, 2017.

* cited by examiner

METHODS AND DEVICES TO EFFICIENTLY DETERMINE NODE DELAY IN A COMMUNICATION NETWORK

BACKGROUND

1. Field of the Invention

The present disclosure relates to network monitoring, and more particularly, to efficiently determining network delay.

2. Description of the Related Art

Traditionally, mobile communication networks such as Global System for Mobile Communications (GSM) network employed circuit switching architectures and technologies whereby hardware circuits establish connections between a calling and a called party throughout the network. This circuit switching architecture was improved upon by a General Packet Radio Service (GPRS) network architecture, which incorporated packet-switching technologies to transport data as packets without the establishment of dedicated circuits. A 3rd Generation Partnership Project (3GPP) organization improved upon the GPRS architecture and provided guidelines for implementing new system topologies for a 3GPP mobile communication network. The GPP community particularly modeled its network on IP (Internet Protocol) based routing techniques and is generally referred to as Evolved 3GPP Packet Switched Domain—also known as the Evolved Packet System (EPS).

When designing, maintaining, and/or operating any communication network—e.g., GSM networks, GPRS networks, EPS networks, and the like—data flows are monitored and analyzed to provide important insight into potential network problems as well as provide insight into a current state of the network (e.g., Quality of Service parameters, etc.). Such network monitoring is used to address existing network problems as well as to improve overall network design.

However, with an increasingly large consumer adoption of mobile devices, the amount of network data to be monitored quickly becomes unwieldy and proves expensive both in terms of hardware support and also in terms of resource usage. For example, some conventional network monitoring techniques require, in part, end-to-end data correlation of incoming data packets with outgoing data packets for a node or network interface and typically requires a large amount of network resources (e.g., dedicated network monitoring resources or otherwise). Further, the conventional monitoring techniques indicate network delay at a very high level and fails to provide meaningful insight into specific target locations where delay occurs. Such high level delay is further complicated by Diameter Routing Agents (DRAs), which were introduced to ensure that messages are routed among the correct nodes for the increasingly complex LTE networks. DRAs potentially introduce delay at specific network locations, which prove hard to detect using conventional monitoring techniques. Accordingly, despite such conventional efforts, a need remains to provide efficient network monitoring techniques that identify delay on a granular scale.

SUMMARY

As discussed herein, the network monitoring techniques, including devices and systems employing the same, determine network delay as a function of separate transactions for various network tap points. A network monitoring device or system monitors various network tap points for network interfaces located at ingress and egress sides of corresponding network nodes in a communication network such as a 3GPP Long Term Evolution (LTE) network. In operation, the network monitoring device captures network traffic such as request and response messages for a transaction and determines delay specific to each tap point. Such techniques obviate the need for end-to-end data correlation and provide granular delay statistics for each tap point and corresponding network node.

More specifically, in one or more exemplary embodiments, a network monitoring device monitors at least one tap point corresponding to a network interface between User Equipment (UE) and one or more additional nodes in the communication network. For example, the nodes can include an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN). The network monitoring device further detects one or more transactions at the at least one tap point corresponding to the network interface. For example, the network monitoring device may correlate the request data with the response data for the transaction based on at least one of a sequence number and a transaction identifier to yield a transaction. In certain embodiments, the network monitoring device further classifies each transaction of the one or more transactions as at least one of an ingress transaction or an egress transaction based on an Internet Protocol (IP) source address of the request data and the response data. The network monitoring device determines a time associated with the request data and a time associated with the response data for each transaction and a delay time for each transaction—e.g., by a difference between the time associated with the request data and the time associated with the response data. The network monitoring device assigns the delay time for each transaction to one or more a predefined time ranges and increment a count corresponding to the one or more predefined time ranges when the delay time is assigned.

In certain embodiments, the network monitoring device compiles the count corresponding to each predefined time range for each tap point into one or more diagrams. Moreover, the count may be compiled when, for example, the count exceeds a threshold value, according to a preset schedule, etc. The diagrams can include bar graphs, histograms, pie-charts, and line-diagrams. Such diagrams are further provided to a display device to cause the display device to provide meaningful insight for network delay for particular nodes, network interfaces, and the like.

In certain other embodiments, the network monitoring device monitors a tap point corresponding to different nodes and compares the delay time for each transaction at each node to determine if one or more of the nodes has an issue. For example, a large increase in average delay for a particular node as compared to an upstream node (ingress side) or downstream node (egress side), may be indicative of an issue at the node and/or at one of the node network interfaces. Such an issue is flagged and/or otherwise indicated to a network operator.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

As discussed above, the 3rd Generation Partnership Project (3GPP) organization specifies the architecture for various mobile cellular networks. The latest mobile network architecture defined by the 3GPP is called Evolved 3GPP Packet Switched Domain—also known as the Evolved Packet Core (EPC).

Figure 1:
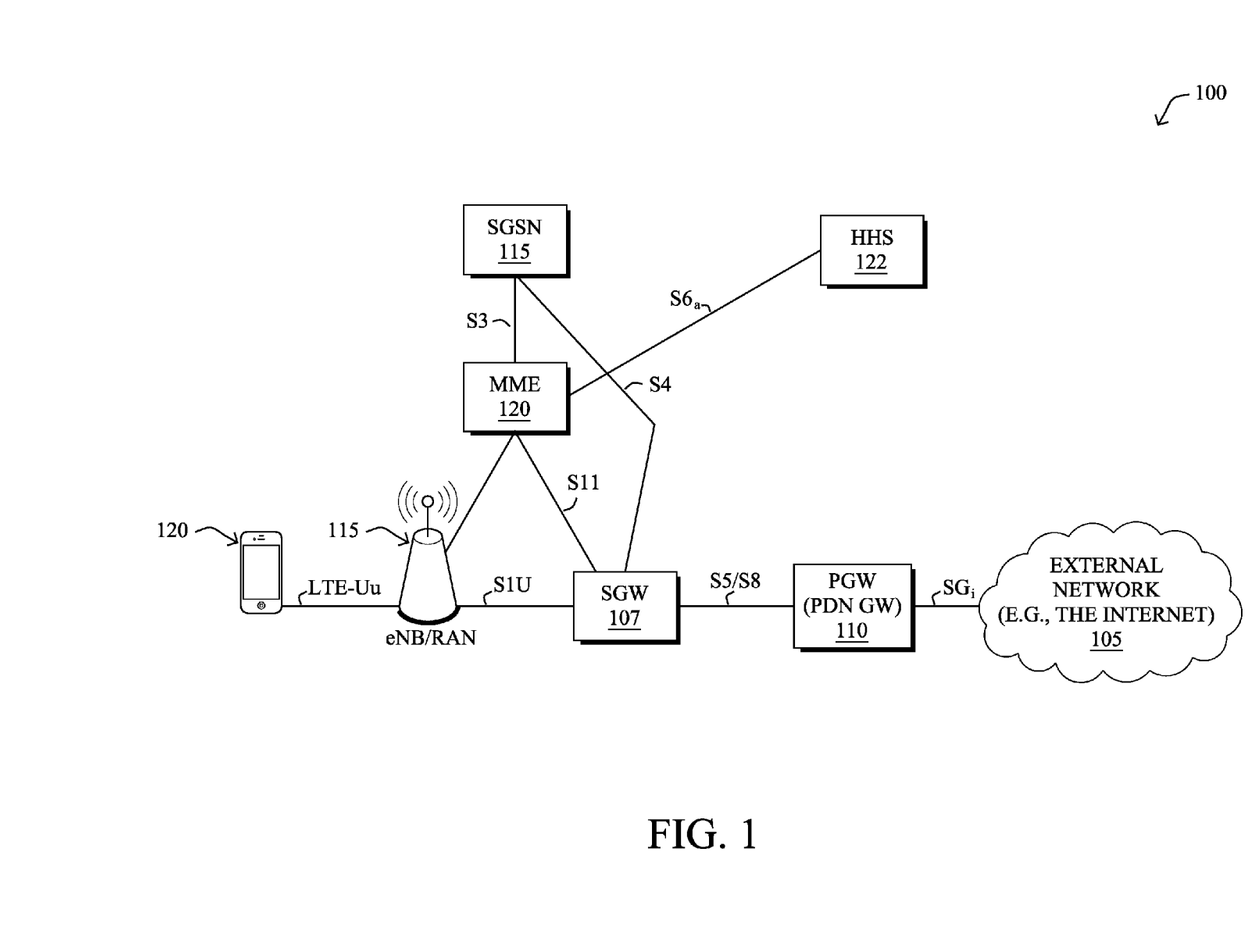
FIG. 1 illustrates an example communication network.

FIG. 1 illustrates an example communication network, particularly showing various components of the 3GPP EPC network 100. As shown, the 3GPP EPC network 100 operatively transmits data packets between an attached User Equipment (UE) 120 and an external network 105—i.e., the Internet. Disposed between UE 120 and the external network 105 are network nodes that perform specific functions. Such network nodes include, for example, evolved nodeB(s) 115 (which form part of Radio Access Networks RANs towers), a Serving Gateway (SGW) node 107, and a Packet Data Network Gateway (PGW) node 110. Further, network 100 includes a Mobility Management Entity (MME) node 120, a Home Subscriber Server (HSS) node 122, and a Serving General Packet Radio Service Node (SGSN) 115. The view shown in FIG. 1 is for exemplary purposes only, and additional nodes/devices can be included or excluded as appreciated by one skilled in the art.

Notably, SGSN 115 generally supports legacy Global System for Mobile (GSM) network components as well as the GPRS Tunneling Protocol (GTP), which communicates data amongst GPRS Support Nodes (GSNs) (not shown). In the GSM context, SGSN 115 is responsible for the delivery of data packets from and to the mobile stations within its geographical service area, including packet routing and transfer, mobility management (attach/detach and location management), logical link management, and authentication and charging functions.

MME node 120 is generally a control-node typically responsible for idle mode UE paging and tagging procedure including retransmissions. It is involved in data bearer activation/deactivation processes and is also responsible for choosing a corresponding SGW node for UE at the initial attach. MME node 120 is also responsible for authenticating the user (by interacting with HSS node 122, which contains user-related and subscription-related information). MME node 120 also provides the control plane function for mobility between Long Term Evolution (LTE) networks and GSM networks supported by SGSN 115. Network interfaces between MME node 120 and SGSN include the S3 interface, and network interfaces between MME node 120 and the HHS (for roaming UE) includes the S6a interface.

SGW node 107 generally routes and forwards user data packets and performs mobility anchoring for the user plane during inter-eNodeB handovers and as an anchor for mobility between LTE and other 3GPP technologies (e.g., terminating S4 interface and relaying the traffic between 2G/3G systems and PGW). For idle state UEs, SGW node 107 terminates the downlink data path and triggers paging when downlink data arrives for the UE. SGW node 107 particularly manages and stores UE contexts (e.g. parameters of the IP bearer service, network internal routing information, etc.).

PGW node 110 generally provides connectivity from UE 120 to external packet data networks 105 (e.g., the Internet) and is a point of exit and entry of traffic for UE 120. Notably, PGW node 110 performs UE IP address allocation and packet filtering (e.g. deep packet inspection, packet screening) in order to map UE 120 traffic to appropriate Quality of Service (QoS) level. PGW node 110 also performs the function of a home agent for MIPv6 (Mobile IPv6) based mobility management, or the function of a Local Mobility Anchor when Proxy MIPv6 protocols are used for mobility management.

Figure 2:
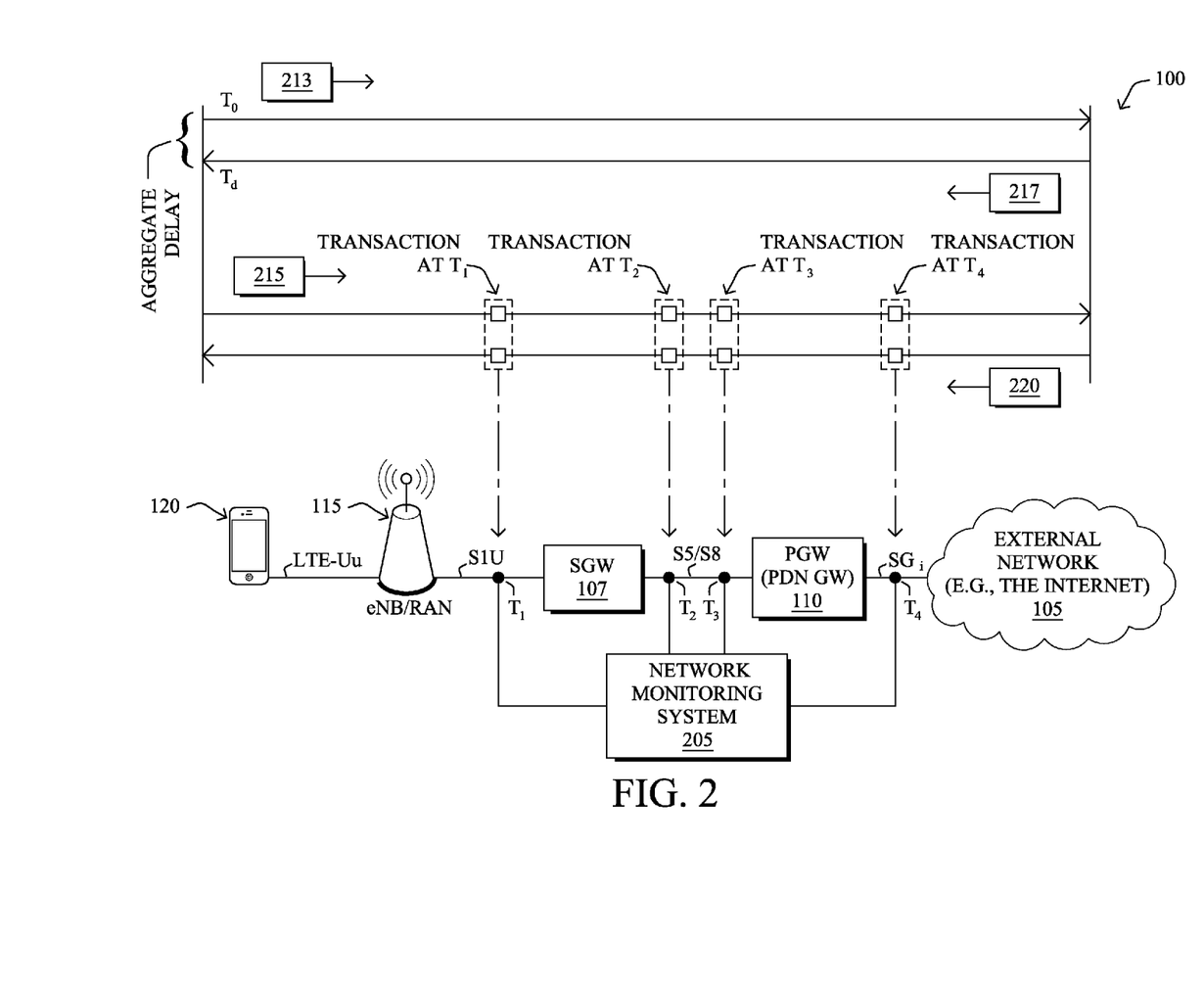
FIG. 2 illustrates a portion of the example communication network shown in FIG. 1, showing a network monitoring device and message flow between User Equipment (UE) and an external network; n example communication network.

FIG. 2 illustrates a portion of the example communication network shown in FIG. 1, showing a network monitoring device 205 and message flow between User Equipment (UE) 120 and external network 105. Operationally, UE 120 sends a data request 213 (e.g., a data packet) toward the external network 105. Data request 213 is routed through network 100 using Internet Protocol (i.e., packet switching) including through network nodes SGW node 107 and PGW node 110 and corresponding network interfaces. Data request 213 is processed by the external network 105 (e.g., by nodes/devices of the external network) and a resultant response 217 is transmitted to UE 120, again routed through network 100 similar to data request 213. An aggregate delay can be determined for UE 120 as a time difference between the time ($T_o$) request 215 is transmitted and the time ($T_d$) response 220 is received. However, this aggregate delay time provides a broad picture of total network delay and proves expensive in terms of hardware as well as network resource usage (e.g., requiring end-to-end data correlation). As discussed above, such aggregate delay time further fails to appreciate delays introduced by particular nodes or corresponding network interfaces.

As discussed herein, the network monitoring techniques (and systems/devices employing the same) determine network delay as a function of separate transactions and at separate network tap points. In particular, still referring to FIG. 2, a network monitoring system, monitors various network tap points, labeled as T1-T4, for network interfaces located at ingress and egress sides of corresponding network nodes. For example, as used herein, ingress messages, relative to a node, include a destination IP address matching the IP address of the node since the ingress message will be inbound or incoming relative to the node (e.g., in packet switched networks). In contrast, egress messages, relative to the node, include a source IP address matching the IP address of the node since the egress message will be sent from the node (e.g., the message will appear to be originating from the node in packet-switched networks relative to the next-hop node). Transactions, such as "Transaction at T1" and "Transaction at T2" include ingress and egress messages relative to a node—here, SGW 107. Determining if a message is ingress or egress relative to the node is determined by matching destination and source IP addresses between the message and the IP address of SGW 107. Operatively, network monitoring system 205 captures network traffic, including request and response messages (e.g., request 215 and response 220) for each transaction and computes delay specific to each tap point T1-T4 (and relative to ingress/egress for corresponding nodes), as discussed in greater detail below.

Figure 3:
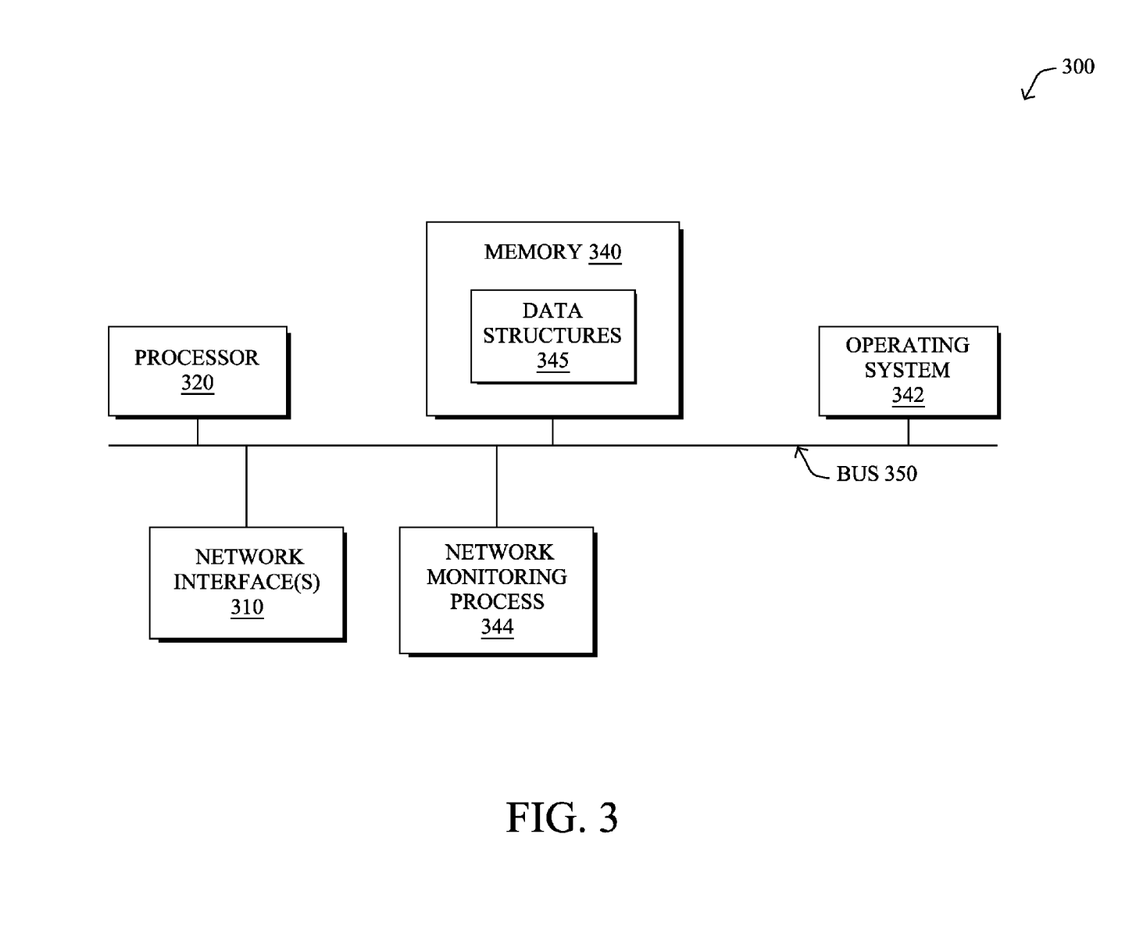
FIG. 3 illustrates an example network device/node.

Referring now to FIG. 3, a schematic block diagram of an example node/device 300 used with one or more embodiments described herein, e.g., as network monitoring system 205 and/or a device within network monitoring system 205. The device 300 comprises one or more network interfaces 310, at least one hardware processor 320 (e.g., a microcontroller), and a memory 340 interconnected by a system bus 350.

The network interface(s) 310 contain the mechanical, electrical, and signaling circuitry for communicating data over physical and/or wireless links coupled to the network 100 (e.g., by tap points 210). The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 340 comprises a plurality of storage locations that are addressable by the processor 320 and the network interfaces 310 for storing software programs and data structures associated with the embodiments described herein. As noted above, certain devices may have limited memory or no memory (e.g., no memory for storage other than for programs/processes operating on the device). The processor 320 may comprise necessary elements or logic adapted to execute the software programs and manipulate data structures 345, such as routes or prefixes (notably on capable devices only). An operating system 342, portions of which are typically resident in memory 340 and executed by the processor, functionally organizes the device by, inter alia, invoking operations in support of software processes and/or services executing on the device. These software processes and/or services may comprise network monitoring process/services 344. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein and within a distributed processing architecture (e.g., according to the functionality of a similar process).

Network monitoring process (services) 344 contains computer executable instructions executed by the processor 320 to perform functions, including packet sniffing, detection, interception, and the like, as will be understood by those skilled in the art. Illustratively, the techniques described herein may be performed by hardware, software, and/or firmware, such as in accordance with the network monitoring process 344, which may contain computer executable instructions executed by the processor 320 (or independent processor of interfaces 310) to perform functions relating to the techniques described herein.

Referring again to FIG. 2, the network monitoring system 205, executes the network monitoring process 344, and determines network delay as a function of separate transactions at each network tap point T1-T4. For example, depending on the protocol, the network monitoring system 205 detects data packets for a transaction by correlating request data with response data based on a sequence number, a transaction identifier, etc. Network monitoring system 205 further associates a time stamp with each of the request data and the response data (e.g., when the data is received by network monitoring system 205). Delay time for transactions at a tap point is determined as the difference between the time stamp associated with the request data and the time associated with the response data.

In certain embodiments, the network monitoring system 205 assigns the determined delay time for each transaction at a tap point to one or more predefined time ranges and increments a count corresponding to each time range. Alternatively, the delay time for each transaction can be maintained independently. The delay time, either aggregated according to time ranges or independently maintained, is reported to a network operator. Preferably, the network monitoring system 205 reports the time delays for corresponding network taps at scheduled time intervals (e.g., every minute, hour, day, etc.). This way, a network operator can garner meaningful insight into network operations such as delay time for each network tap point (corresponding to ingress or egress side network interfaces for network nodes).

Figure 4A:
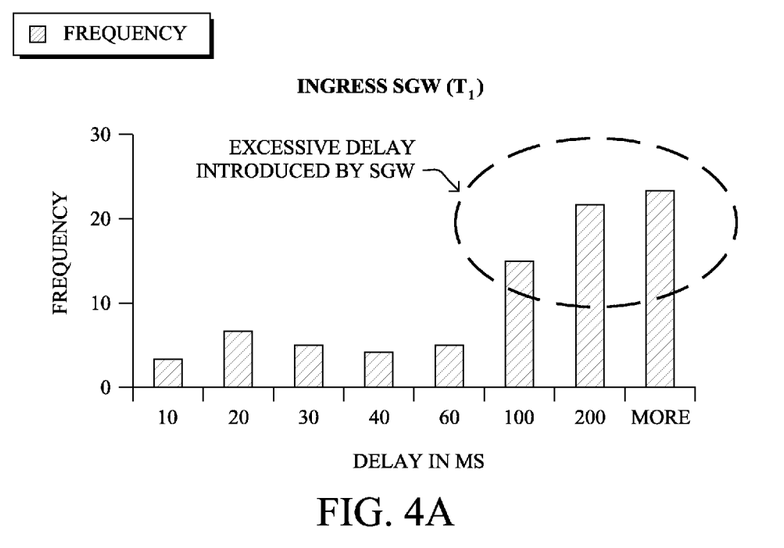
FIG. 4A illustrates an example chart, showing ingress delay from a node in the network shown in FIG. 1.
Figure 4B:
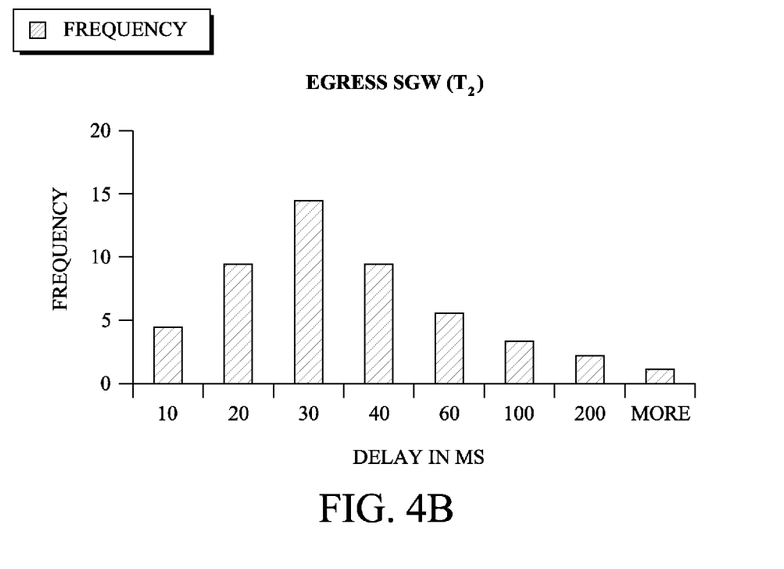
FIG. 4B illustrates another example chart, showing egress delay from a node in the network shown in FIG. 1.

In preferred embodiments, the delay time is reported to a network operator using one or more charts, diagrams, graphs and the like. For example, FIG. 4A is a histogram chart 400 showing ingress delay from SGW node 107 for transactions monitored at tap point T1 and FIG. 4B is a histogram chart 401, showing egress delay from SGW node 107 for transactions monitored at tap point T2. A network operator can quickly scan such charts to efficiently identify and troubleshoot excessive network delays at particular network nodes, tap points, network interfaces, etc. For example, a network operator looking at FIG. 4A can quickly determine there is a high frequency of large delay time for the ingress side of SGW node 107 and begin troubleshooting processes. It is appreciated that the delay time determined at each tap point (for respective ingress sides or egress sides of network nodes) can be presented in any number of ways to a network operator and that FIGS. 4A-4B are merely exemplary charts for purposes of discussion, not limitation. For example, charts can include multiple nodes (ingress side, egress side, combinations thereof, etc.) and present such information so a network operator can quickly compare nodal network delays and identify issues with excessive delay at a particular node, interface, tap point, etc.

Figure 5A:
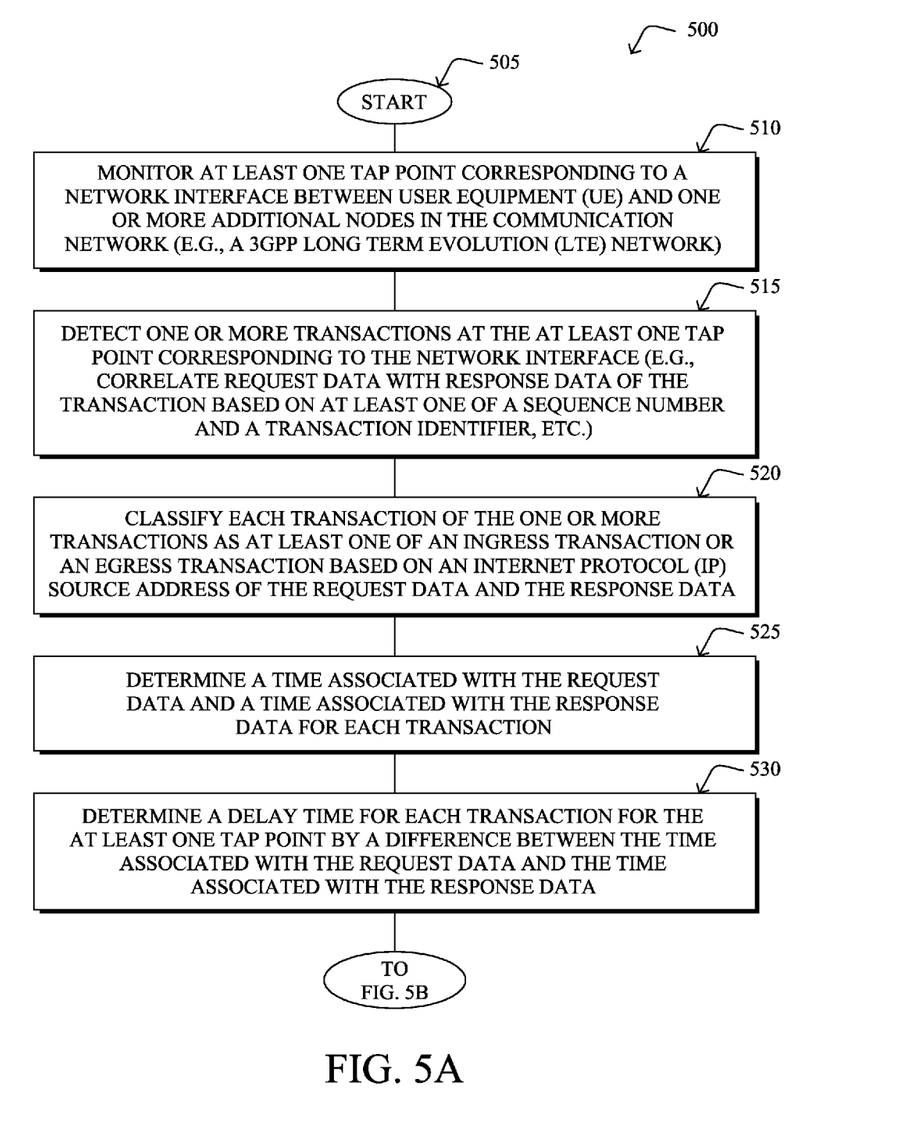
FIGS. 5A-5B illustrate an example simplified procedure for determining network delay, particularly from the perspective of the network monitoring node shown in FIG. 2.
Figure 5B:
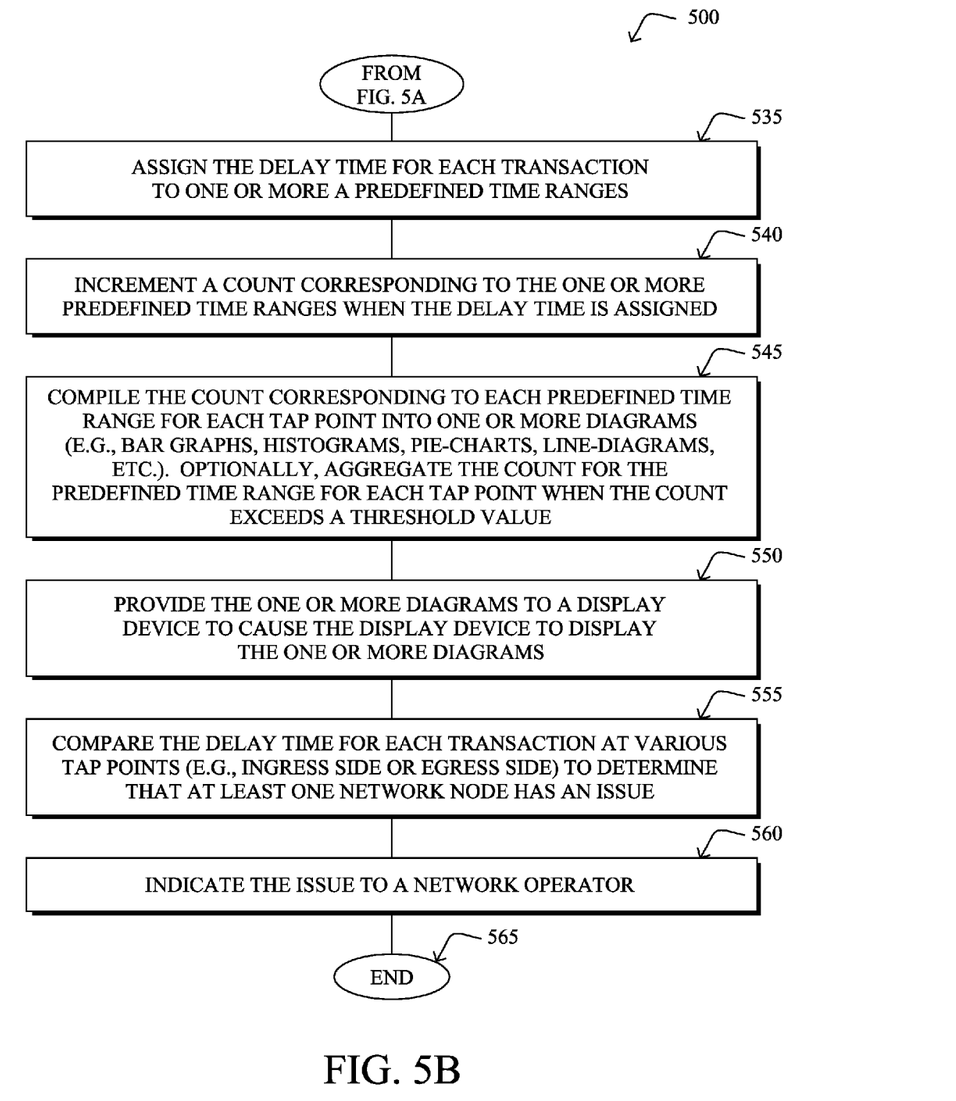

FIGS. 5A-5B illustrate an example simplified procedure 500 for monitoring network delay, particularly from the perspective of network monitoring system 205, in accordance with one or more embodiments described herein.

Referring to FIG. 5A, procedure 500 begins at step 505 and continues to step 510 where, as discussed above, the network monitoring system monitors at least one tap point corresponding to a network interface between User Equipment (UE) and one or more additional nodes in the communication network (e.g., a 3GPP Long Term Evolution (LTE) network, etc.). These nodes can include, for example, an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN). Next, in step 515, the network monitoring system detects one or more transactions at the at least one tap point corresponding to the network interface. For example, the network monitoring system correlates request data with response data of the transaction (depending on the protocol) based on at least one of a sequence number and a transaction identifier, etc. Further, in step 520, the network monitoring system classifies each transaction as, for example, an ingress transaction or an egress transaction based on an Internet Protocol (IP) source address of the request data and the response data. A time stamp, e.g., upon receipt, is associated with the request data and the response data for each transaction in step 525, and in step 530, the network monitoring system determines a delay time for each transaction for the tap point by a difference between the time associated with the request data and the time associated with the response data.

Procedure 500 continues to FIG. 5B, where, for certain embodiments, delay time for each transaction is assigned to one or more a predefined time ranges shown in step 535. In such embodiments, the network monitoring system increments, in step 540, a count corresponding to the one or more predefined time ranges when the delay time is assigned. Further, the network monitoring system compiles, in step 545, the count corresponding to each predefined time range for each tap point into one or more diagrams (e.g., bar graphs, histograms, pie-charts, line-diagrams, etc.). Optionally, in step 545, the network monitoring node compiles the count for the predefined time range for each tap point when the count exceeds a threshold value (e.g., a minimum count, a maximum count, etc.). In step 550, the network monitoring node provides the one or more diagrams to a display device to cause the display device to display the one or more diagrams (e.g., to a network operator).

In certain other embodiments, the network monitoring system compares the delay time for each transaction at various tap points (e.g., ingress side or egress side) to determine that at least one network node has an issue (step 555) and indicates the issue to a network operator (step 560).

Procedure 500 subsequently ends at step 565, but may begin again at step 510 where the network monitoring node monitors the tap point(s).

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for efficient network delay monitoring amongst various network nodes, interfaces, and the like. In particular, the techniques herein significantly reduce the processing time to determine delay and obviate the need to determine end-to-end data correlation. Moreover, using these techniques, a granular delay time is determined at each tap point and provides a network operator valuable information used when troubleshooting issues.

While there have been shown and described illustrative embodiments that provide for determining network delay, it is to be understood that various other adaptations and modifications may be made within the spirit and scope of the embodiments herein. For example, the embodiments have been shown and described herein with relation to 3GPP LTE networks and particular protocols. However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for measuring delay in a communication network, comprising:
    monitoring, by a network monitoring node, at least one tap point corresponding to a network interface between User Equipment (UE) and one or more additional nodes in the communication network, wherein the at least one tap point comprises at least a first tap point and a second tap point, the first tap point and the second tap point corresponding to first and second network nodes of the additional nodes, wherein the first tap point includes a first tap location at an ingress side of the first network node and a second tap location at an egress side of the first network node, and the second tap point includes a third tap location at an ingress side of the second network node and a fourth tap location at an egress side of the second network node;
    detecting, by the network monitoring node, one or more transactions at the at least one tap point corresponding to the network interface, each transaction including request data and response data;
    classifying, by the network monitoring node, each transaction detected at the respective at least one tap point as an ingress or egress transaction relative to the node that corresponds to the tap point;
    determining, by the network monitoring node, a time associated with the request data and a time associated with the response data for each transaction as classified;
    determining, by the network monitoring node, a delay time for each transaction as classified, for each of the ingress and egress side of the at least one tap point by a difference between the time associated with the request data and the time associated with the response data;
    assigning, by the network monitoring node, the delay time for each transaction as classified, for each of the ingress and egress side of the at least one tap point to one or more predefined time ranges;
    incrementing, by the network monitoring node, a count corresponding to the one or more predefined time ranges when the delay time is assigned;
    comparing, by the network monitoring node, the delay time for each transaction as classified at the first tap point to the delay time for each transaction as classified at the second tap point to determine that a particular network node of the first and second network nodes has an issue associated with an excessive delay; and
    indicating, by the network monitoring node, the issue to a network operator, responsive to detecting the issue.

2. The method of claim 1, wherein the one or more additional nodes comprises at least one of an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN).

3. The method of claim 1, further comprising:
compiling, by the network monitoring node, prior to comparing the delay time, the count corresponding to each predefined time range for each tap point into one or more diagrams; and
providing, by the network monitoring node, the one or more diagrams to a display device to cause the display device to display the one or more diagrams.

4. The method of claim 3, wherein the network monitoring node compiles the count corresponding to each predefined time range for each tap point into the one or more diagrams when the count exceeds a threshold value.

5. The method of claim 3, wherein the one or more diagrams includes at least one of bar graphs, histograms, pie-charts, and line-diagrams.

6. The method of claim 1, wherein detecting the one or more transactions at the at least one tap point corresponding to the network interface further comprises:
correlating, by the network monitoring node, the request data with the response data for the transaction based on at least one of a sequence number and a transaction identifier.

7. The method of claim 1, wherein, classifying each transaction, by the network monitoring node, is performed after detecting the one or more transactions, based on an Internet Protocol (IP) source address of the request data and the response data.

8. The method of claim 1, wherein each of the first tap point and the second tap point further correspond to one of an ingress side or an egress side of the corresponding different network nodes.

9. The method of clam 1, wherein the communication network is a Long Term Evolution (LTE) network.

10. A network monitoring device, comprising:
one or more network interfaces adapted to communicate in a communication network;
a hardware processor adapted to execute one or more processes; and
a memory configured to store a process executable by the processor, the process when executed operable to:
monitor at least one tap point corresponding to a network interface between User Equipment (UE) and one or more additional nodes in the communication network, wherein the at least one tap point comprises at least a first tap point and a second tap point, the first tap point and the second tap point corresponding to first and second network nodes of the additional nodes, wherein the first tap point includes a first tap location at an ingress side of the first network node and a second tap location at an egress side of the first network node, and the second tap point includes a third tap location at an ingress side of the second network node and a fourth tap location at an egress side of the second network node;
detect one or more transactions at the at least one tap point corresponding to the network interface, each transaction including request data and response data;
classify each transaction detected at the respective at least one tap point as an ingress or egress transaction relative to the node that corresponds to the tap point;
determine a time associated with the request data and a time associated with the response data for each transaction as classified;
determine a delay time for each transaction as classified for each of the ingress and egress side of the at least one tap point by a difference between the time associated with the request data and the time associated with the response data;
assign the delay time, for each transaction as classified, for each of the ingress and egress side of the at least one tap point to one or more predefined time ranges;
increment a count corresponding to the one or more predefined time ranges when the delay time is assigned;
compare the delay time for each transaction as classified at the first tap point to the delay time for each transaction as classified at the second tap point to determine that a particular network node of the first and second network nodes has an issue associated with an excessive delay; and
indicate the issue to a network operator, responsive to detecting the issue.

11. The network monitoring device of claim 9, wherein the one or more additional nodes comprises at least one of an Evolved Node B (eNB), a Mobility Management Entity (MME) node, a Serving Gateway (SGW) node, a Packet data Network Gateway (PGW) node, and a Serving General Packet Radio Service (GPRS) Support Node (SGSN).

12. The network monitoring device of claim 10, wherein the process, when executed is further operable to:
compile, prior to comparing the delay time, the count corresponding to each predefined time range for each tap point into one or more diagrams; and
provide the one or more diagrams to a display device to cause the display device to display the one or more diagrams.

13. The network monitoring device of claim 12, wherein the network monitoring device compiles the count corresponding to each predefined time range for each tap point into the one or more diagrams when the count exceeds a threshold value.

14. The network monitoring device of claim 12, wherein the one or more diagrams includes at least one of bar graphs, histograms, pie-charts, and line-diagrams.

15. The network monitoring device of claim 10, wherein when the network monitoring device detects the one or more transactions at the at least one tap point corresponding to the network interface, the network monitoring device further:
correlates the request data with the response data for the transaction based on at least one of a sequence number and a transaction identifier.

16. The network monitoring device of claim 10, wherein classifying each transaction is performed after detecting the one or more transactions, based on an Internet Protocol (IP) source address of the request data and the response data.

17. The network monitoring device of claim 10, wherein each of the first tap point and the second tap point further correspond to one of an ingress side or an egress side of the corresponding different network nodes.

18. The network monitoring device of claim 10, wherein the communication network is a Long Term Evolution (LTE) network.

19. A tangible, non-transitory, computer-readable media having software encoded thereon, the software, when executed by a processor, operable to:
monitor at least one tap point corresponding to a network interface between User Equipment (UE) and one or more additional nodes in the communication network, wherein the at least one tap point comprises at least a first tap point and a second tap point, the first tap point and the second tap point corresponding to first and second network nodes of the additional nodes, wherein the first tap point includes a first tap location at an ingress side of the first network node and a second tap location at an egress side of the first network node, and the second tap point includes a third tap location at an ingress side of the second network node and a fourth tap location at an egress side of the second network node;

detect one or more transactions at the at least one tap point corresponding to the network interface, each transaction including request data and response data;

classify each transaction detected at the respective at least one tap point as an ingress or egress transaction relative to the node that corresponds to the tap point;

determine a time associated with the request data and a time associated with the response data for each transaction as classified;

determine a delay time for each transaction as classified for each of the ingress and egress side of the at least one tap point by a difference between the time associated with the request data and the time associated with the response data;

assign the delay time for each transaction as classified, for each of the ingress and egress side of the at least one tap point to one or more predefined time ranges;

increment a count corresponding to the one or more predefined time ranges when the delay time is assigned;

compare the delay time for each transaction as classified at the first tap point to the delay time for each transaction as classified at the second tap point;

determine based on the comparison, that a particular network node of the first and second network nodes has an issue associated with an excessive delay; and indicate the issue to a network operator, responsive to detecting the issue.

* * * * *